United States Patent
Meier et al.

(10) Patent No.: US 11,845,854 B2
(45) Date of Patent: *Dec. 19, 2023

(54) POLYETHYLENE COMPOSITION FOR FILMS

(71) Applicant: BASELL POLYOLEFINE GMBH, Wesseling (DE)

(72) Inventors: Gerhardus Meier, Houston, TX (US); Ulf Schueller, Weiterstadt (DE); Andreas Maus, Frankfurt (DE); Harilaos Mavridis, Lebanon, OH (US)

(73) Assignee: Basell Polyolefine GmbH, Wesseling (DE)

( * ) Notice: Subject to any disclaimer, the term of this patent is extended or adjusted under 35 U.S.C. 154(b) by 360 days.

This patent is subject to a terminal disclaimer.

(21) Appl. No.: 17/275,874

(22) PCT Filed: Sep. 4, 2019

(86) PCT No.: PCT/EP2019/073505
§ 371 (c)(1),
(2) Date: Mar. 12, 2021

(87) PCT Pub. No.: WO2020/057968
PCT Pub. Date: Mar. 26, 2020

(65) Prior Publication Data
US 2021/0284828 A1 Sep. 16, 2021

Related U.S. Application Data

(60) Provisional application No. 62/734,231, filed on Sep. 20, 2018.

(51) Int. Cl.
*C08F 210/16* (2006.01)
*C08F 2/00* (2006.01)
(Continued)

(52) U.S. Cl.
CPC ............ *C08L 23/06* (2013.01); *C08F 210/16* (2013.01); *C08J 5/18* (2013.01); *C08L 23/0815* (2013.01);
(Continued)

(58) Field of Classification Search
CPC ..... C08F 210/16; C08L 23/0815; C08L 23/16
See application file for complete search history.

(56) References Cited

U.S. PATENT DOCUMENTS 4,399,054 A 8/1983 Ferraris et al.
4,469,648 A 9/1984 Ferraris et al.
(Continued)

FOREIGN PATENT DOCUMENTS

CA 2901419 A1 9/2014
CA 2990500 A1 12/2016
(Continued)

OTHER PUBLICATIONS

International Search Report and Written Opinion dated Nov. 25, 2019 (dated Nov. 29, 2019) for Corresponding PCT/EP2019/073505.

*Primary Examiner* — Rip A Lee

(57) ABSTRACT

A polyethylene composition for producing blown films, made from or containing an ethylene homopolymer or copolymer A) and an ethylene copolymer B) having a MIE value lower than the MIE value of A), the composition having the following features:
1) density from 0.948 to 0.960 g/cm$^3$;
2) ratio MIF/MIP from 20 to 40;
3) MIF from 6 to less than 15 g/10 min.;
4) HMWcopo index from 0.5 to 3.5;
5) long-chain branching index, LCBI, equal to or lower than 0.82;
6) $\eta_{0.02}$ of equal to or less than 150000.

11 Claims, 1 Drawing Sheet

(51) Int. Cl.
  *C08L 23/06* (2006.01)
  *C08J 5/18* (2006.01)
  *C08L 23/08* (2006.01)

(52) U.S. Cl.
  CPC ........... *C08F 2/001* (2013.01); *C08J 2323/06* (2013.01); *C08J 2323/08* (2013.01); *C08J 2423/06* (2013.01); *C08J 2423/08* (2013.01)

(56) References Cited

U.S. PATENT DOCUMENTS

| | | | |
|---|---|---|---|
| 4,829,034 | A | 5/1989 | Iiskolan et al. |
| 5,100,849 | A | 3/1992 | Miya et al. |
| 5,534,472 | A | 7/1996 | Winslow et al. |
| 10,457,800 | B2* | 10/2019 | Vittorias ................ B32B 27/08 |
| 10,570,277 | B2* | 2/2020 | Doetsch ................ C08L 23/06 |
| 10,570,278 | B2* | 2/2020 | Doetsch ................ C08F 210/02 |
| 10,577,490 | B2* | 3/2020 | Vittorias ................ B32B 27/32 |
| 10,619,035 | B2* | 4/2020 | Vittorias ................ C08L 23/06 |
| 10,920,050 | B2* | 2/2021 | Doetsch ................ C08F 2/001 |
| 11,479,660 | B2* | 10/2022 | Doetsch ................ C08F 4/022 |
| 11,485,838 | B2* | 11/2022 | Doetsch ................ C08F 2/001 |
| 2018/0179367 | A1 | 6/2018 | Vittorias et al. |
| 2018/0237621 | A1* | 8/2018 | Vittorias ................ B32B 27/08 |

FOREIGN PATENT DOCUMENTS

| | | |
|---|---|---|
| EP | 395083 A2 | 10/1990 |
| EP | 1655334 A1 | 5/2006 |
| JP | 2018518579 A | 7/2018 |
| RU | 2299219 C2 | 5/2007 |
| WO | 9844009 A1 | 10/1998 |
| WO | 0185803 A2 | 11/2001 |
| WO | 2005019280 A1 | 3/2005 |
| WO | 2016206958 A1 | 12/2016 |
| WO | 2018091261 A1 | 5/2018 |
| WO | 2018095701 A1 | 5/2018 |

* cited by examiner

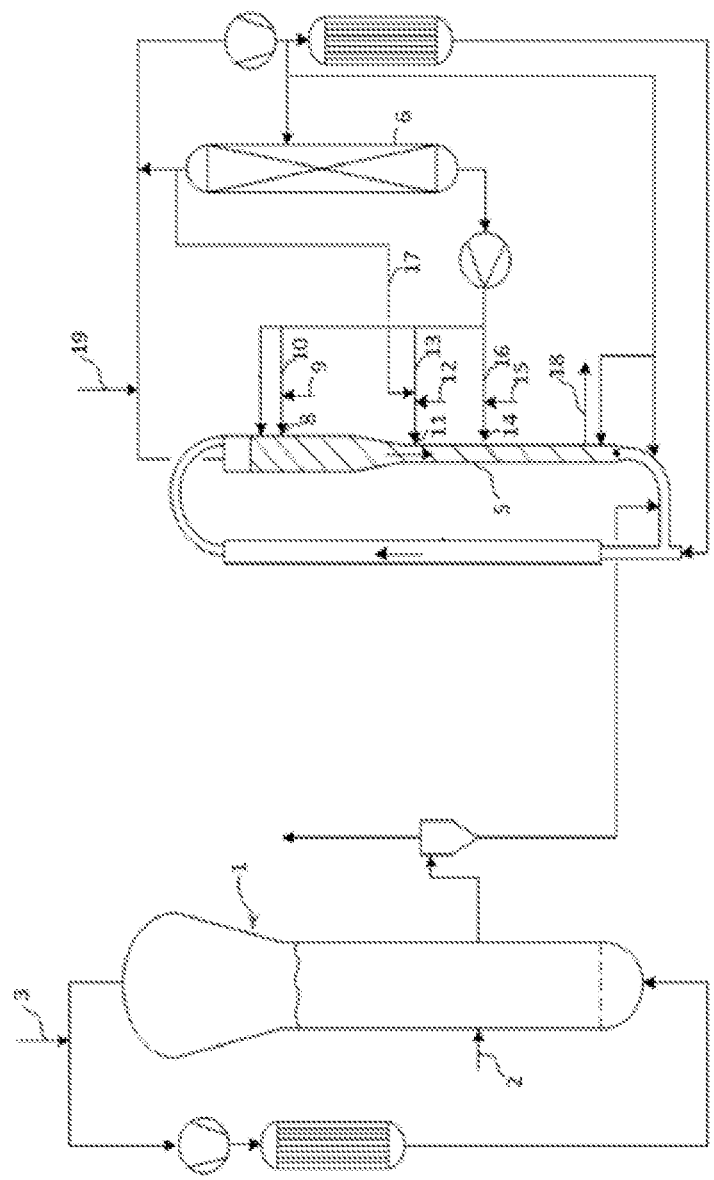

POLYETHYLENE COMPOSITION FOR FILMS

This application is the U.S. National Phase of PCT International Application PCT/EP2019/073505, filed Sep. 4, 2019, claiming benefit of priority to European Patent Application No. 62/734,231, filed Sep. 20, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure provides a polyethylene composition.

The present disclosure further provides a multi-stage polymerization process for preparing the polyethylene composition.

BACKGROUND OF THE INVENTION

In some instances, polyethylene is used for producing films by the blown film extrusion process.

SUMMARY OF THE INVENTION

In a general embodiment, the present disclosure provides a polyethylene composition made from or containing:
A) 30-70% by weight of an ethylene homopolymer or copolymer with density equal to or greater than 0.960 g/cm³, determined according to ISO 1183-1:2012 at 23° C., and melt flow index MIE at 190° C. with a load of 2.16 kg, according to ISO 1133-2:2011, of 130 g/10 min. or lower; and
B) 30-70% by weight of an ethylene copolymer having a MIE value lower than the MIE value of A);
the amounts of A) and B) being referred to the total weight of A)+B);
the polyethylene composition having the following features:
1) density from 0.948 to 0.960 g/cm³, determined according to ISO 1183-1:2012 at 23° C.;
2) ratio MIF/MIP from 20 to 40, where MIF is the melt flow index at 190° C. with a load of 21.60 kg, and MIP is the melt flow index at 190° C. with a load of 5 kg, both determined according to ISO 1133-2:2011;
3) MIF from 6 to 15 g/10 min.;
4) HMWcopo index from 0.5 to 3.5;
5) long-chain branching index, LCBI, equal to or lower than 0.82;
wherein the HMWcopo index is determined according to the following formula:

$$\text{HMWcopo} = (\eta_{0.02} \times t_{maxDSC})/(10^5)$$

wherein $\eta_{0.02}$ is the complex viscosity of the melt in Pa·s, measured at a temperature of 190° C., in a parallel-plate rheometer under dynamic oscillatory shear mode with an applied angular frequency of 0.02 rad/s; $t_{maxDSC}$ is the time in minutes to reach the maximum value of heat flow of crystallization at a temperature of 124° C. under quiescent conditions, measured in isothermal mode in a differential scanning calorimetry apparatus; and LCBI is the ratio of the measured mean-square radius of gyration $R_g$, measured by GPC-MALLS, to the mean-square radius of gyration for a linear PE having the same molecular weight at a molecular weight of 1,000,000 g/mol.; and
6) $\eta_{0.02}$ of equal to or less than 150000.

In some embodiments, the MIP values for the polyethylene composition ranges from about 0.15 to about 0.75 g/10 min.

In some embodiments, the present disclosure provides a polyethylene composition made from or containing
A) 30-70% by weight, alternatively 40-60% by weight, of an ethylene homopolymer or copolymer with density equal to or greater than 0.960 g/cm³, determined according to ISO 1183-1:2012 at 23° C., and melt flow index MIE at 190° C. with a load of 2.16 kg, according to ISO 1133-2:2011, of 130 g/10 min. or lower, alternatively of 120 g/10 min. or lower, alternatively from 50 to 130 g/10 min., alternatively from 55 to 120 g/10 min.; and
B) 30-70% by weight, alternatively 40-60% by weight, of an ethylene copolymer having a MIE value lower than the MIE value of A), alternatively lower than 0.5 g/10 min.;
the amounts of A) and B) being referred to the total weight of A)+B);
the polyethylene composition having the following features:
1) density from 0.948 to 0.960 g/cm³, alternatively from 0.949 to 0.958 g/cm³, determined according to ISO 1183-1:2012 at 23° C.;
2) ratio MIF/MIP from 20 to 40, alternatively from 20 to 38, alternatively from 25 to 38, alternatively from 20 to 35, alternatively from 25 to 35, where MIF is the melt flow index at 190° C. with a load of 21.60 kg, and MIP is the melt flow index at 190° C. with a load of 5 kg, both determined according to ISO 1133-2:2011;
3) MIF from 6 to 15 g/10 min. alternatively from 6 to 13 g/10 min., alternatively from 6.5 to 15 g/10 min., alternatively from 6.5 to 13 g/10 min.;
4) HMWcopo index from 0.5 to 3.5, alternatively from 0.5 to 3.3, alternatively from 0.8 to 3.3, alternatively from 0.5 to 3.0, alternatively from 0.8 to 3.3 or from 0.8 to 3.0;
5) long-chain branching index, LCBI, equal to or lower than 0.82, alternatively equal to or lower than 0.80, alternatively equal to or lower than 0.72, alternatively from 0.82 to 0.45, alternatively from 0.80 to 0.45, alternatively from 0.72 to 0.45;
wherein the HMWcopo index is determined according to the following formula:

$$\text{HMWcopo} = (\eta_{0.02} \times t_{maxDSC})/(10^5)$$

wherein
$\eta_{0.02}$ is the complex viscosity of the melt in Pa·s, measured at a temperature of 190° C., in a parallel-plate rheometer under dynamic oscillatory shear mode with an applied angular frequency of 0.02 rad/s;
$t_{maxDSC}$ is the time in minutes to reach the maximum value of heat flow of crystallization at a temperature of 124° C. under quiescent conditions, measured in isothermal mode in a differential scanning calorimetry apparatus; and
LCBI is the ratio of the measured mean-square radius of gyration $R_g$, measured by GPC-MALLS, to the mean-square radius of gyration for a linear PE having the same molecular weight at a molecular weight of 1,000, 000 g/mol.; and
6) $\eta_{0.02}$ of equal to or less than 150000, alternatively equal to or less than 130000, alternatively equal to or less than 125000, alternatively the lower limit being 40000 in the cases, alternatively the lower limit being 50000 in the cases.

In some embodiments, component A) is an ethylene homopolymer.

BRIEF DESCRIPTION OF THE DRAWINGS

These and other features of the present disclosure will become better understood with reference to the following description and appended claims, and accompanying drawing figure. The FIGURE is a simplified process-flow diagram of two serially connected gas-phase reactors for use in ethylene polymerization processes to produce various polyethylene compositions.

It should be understood that the various embodiments are not limited to the arrangements and instrumentality shown in the drawing FIGURE.

DETAILED DESCRIPTION OF THE INVENTION

As used herein, the expression "polyethylene composition" embraces a composition of two or more ethylene polymer components. In some embodiments, the ethylene polymer components have different molecular weights. As used herein, this composition may be referred to as "bimodal" or "multimodal" polymer.

In some embodiments, the present polyethylene composition is made from or contains one or more ethylene copolymers.

The features herein defined, including features 1) to 6), are as features of the ethylene polymer composition. In some embodiments, the addition of other components modifies one or more of the features.

In some embodiments and to modify rheological and structural features, the polyethylene composition is reacted with a radical initiator. In some embodiments, the rheological feature modified is the melt index value. In some embodiments, rheological or structural features are modified to within the aforementioned ranges. In some embodiments, rheological or structural features are modified to outside the aforementioned ranges.

In some embodiments, the radical initiator is selected from organic peroxides.

In some embodiments, the organic peroxides are selected from the group consisting of organic monoperoxides and organic diperoxides. In some embodiments, the organic monoperoxides and diperoxides have a half-life of 1 hour at a temperature in the range of about 125° C. to about 145° C., alternatively in the range of about 130° C. to about 140° C., alternatively in the range of about 132° C. to about 136° C. In some embodiments, the organic peroxides have a half-life of 0.1 hour at a temperature in the range of about 145° C. to 165° C., alternatively in the range of about 150° C. to about 160° C., alternatively in the range of about 154° C. to 158° C. In some embodiments, the organic peroxide has a molecular weight in the range of about 175 g/mol to about 375 g/mol, alternatively in the range of about 200 g/mol to about 350 g/mol. In some embodiments, the organic peroxide is a mixture of two or more peroxides. In some embodiments, the organic peroxides are selected from the group consisting of dicumyl peroxide (CAS® registry number 80-43-3), di(tert-butylperoxyisopropyl)benzene(s) (CAS® registry number 25155-25-3), 2,5-dimethyl-2,5-di(tert-butylperoxy)hexane (CAS® registry number 78-63-7), tert-butyl cumyl peroxide (CAS® registry number 3457-61-2), and 2,5-dimethyl-2,5-di(tert-butylperoxy)hexyne (CAS® registry number 1068-27-5), and mixtures thereof.

In some embodiments, the organic peroxide is 2,5-dimethyl-2,5-di(tert-butylperoxy)hexane.

In some embodiments, the radical-initiated reactions are run in the apparatuses used for processing polymers in the molten state. In some embodiments, the apparatuses are twin screw extruders. In some embodiments, the apparatuses are operated under inert atmosphere, alternatively under nitrogen.

In some embodiments, the amount of radical initiator added to the polyethylene composition is in the range of from 0.1 to 100 ppm by weight, alternatively from 0.5 to 100 ppm by weight, of peroxide to polyethylene composition. In some embodiments, the amount of radical initiator added to the polyethylene composition is determined via rheology or via film testing. In some embodiments, the amount of radical initiator added to the polyethylene composition is determined via desired change in the rheological polydispersity ER. In some embodiments, the amount of radical initiator added to the polyethylene composition is determined via bubble stability testing.

In some embodiments, the reaction temperature is in the range of from 180 to 300° C.

It is believed that the ratio MIF/MIP provides a rheological measure of molecular weight distribution.

Another measure of the molecular weight distribution is provided by the ratio $M_w/M_n$, where $M_w$ is the weight average molar mass and $M_n$ is the number average molar mass, measured by GPC (Gel Permeation Chromatography).

In some embodiments, the $M_w/M_n$ values for the polyethylene composition range from 25 to 65, alternatively from 30 to 65.

In some embodiments, the $M_w$ values are from 200,000 to 400,000 g/mol.

Additional information on the molecular weight distribution is provided by the rheological polydispersity ER, which is determined from plots of storage modulus (G') versus loss modulus (G") and is a measure of high-molecular-weight-end polydispersity. The rheological polydispersity is calculated from:

$$ER = (1.781 * 10^{-3}) * G'$$

at a value of G"=5,000 dyn/cm².

In some embodiments, ER values for the polyethylene composition range from 2 to 5.

In some embodiments, the polyethylene composition has at least one of the following additional features.

density of ethylene homopolymer or copolymer A) from 0.960 to 0.971 g/cm³, alternatively from 0.965 to 0.970 g/cm³;

ratio 00.02/1000V LCBI, which is between $\eta_{0.02}$ divided by 1000 and LCBI, of from 120 to 180, alternatively from 125 to 178;

Comonomer content equal to or less than 2% by weight, alternatively from 0.2 to 2% by weight, with respect to the total weight of the composition (as determined by IR);

ET values equal to or lower than 25, alternatively from 3 to 25;

wherein ET is calculated from:

$$ET = C_2/G^* \text{ at } \tan \delta = C_3,$$

wherein:

$G^* = [(G')^2 + (G'')^2]^{1/2}$;

$\tan \delta = G''/G'$;

$C_2 = 10^6 \text{ dyn/cm}^2$;

$C_3 = 1.5$;

G'=storage-modulus; and

G''=loss-modulus;

both G' and G" being measured with dynamic oscillatory shear in a plate-plate rotational rheometer at a temperature of 190° C.; or long-chain branching index, LCBI, equal to or lower than 0.70, alternatively from 0.70 to 0.45.

In some embodiments, the MIF values range from 9 to 15 g/10 min., alternatively from 9 to 13 g/10 min.

In some embodiments, the comonomer or comonomers present in the ethylene copolymers are selected from olefins having formula CH$_2$=CHR wherein R is an alkyl radical, linear or branched, having from 1 to 10 carbon atoms.

In some embodiments, the comonomer or comonomers are selected from the group consisting of propylene, butene-1, pentene-1, 4-methylpentene-1, hexene-1, octene-1 and decene-1. In some embodiments, the comonomer is hexene-1.

In some embodiments, the polyethylene composition is processed by a film blowing process.

In some embodiments, the bubble stability score of a blown film of the polyethylene composition is higher than 40 and the DDI is higher than 200 g, alternatively higher than 350 g for a film thickness of 12.5 µm.

In some embodiments and for values of DDI from 200 to 350 g, the bubble stability score (BSS) is of 52 or higher, alternatively from 52 to 80. In some embodiments and for values of DDI of higher than 350 g, the BSS score is of 40 or higher, alternatively from 40 to less than 80.

In some embodiments, the film bubble, made from or containing the polyethylene composition, coming out from the annular die is stable and shows no tendency to alter geometry in axial or radial directions.

In some embodiments, the bubble has a frost line delimiting the molten material from the solidified material oscillating not more than ±3 cm in axial direction during the bubble stability test (performed as detailed in the examples) at a maximal take-off speed.

In some embodiments, the present disclosure provides a blown film made from or containing the polyethylene composition. In some embodiments, the blown film is mono- or multilayer, wherein at least one layer is made from or contains the polyethylene composition.

In some embodiments, the blown film has a thickness in the range from 5 to 200 µm, alternatively from 10 to 100 µm.

In some embodiments, the polyethylene composition is prepared by a gas phase polymerization process in the presence of a Ziegler-Natta catalyst.

As used herein, a Ziegler-Natta catalyst is made from or contains the product of a reaction of an organometallic compound of group 1, 2 or 13 of the Periodic Table of elements with a transition metal compound of groups 4 to 10 of the Periodic Table of Elements (new notation). In some embodiments, the transition metal compound is selected from the group consisting of compounds of Ti, V, Zr, Cr and Hf. In some embodiments, the transition metal compound is supported on MgCl$_2$.

In some embodiments, the catalysts are made from or contain the product of the reaction of the organometallic compound of group 1, 2 or 13 of the Periodic Table of elements, with a solid catalyst component made from or containing a Ti compound supported on MgCl$_2$.

In some embodiments, the organometallic compounds are organo-Al compounds.

In some embodiments, the polyethylene composition is obtainable by using a Ziegler-Nana polymerization catalyst, alternatively a Ziegler-Natta catalyst supported on MgCl$_2$, alternatively a Ziegler-Natta catalyst made from or containing the product of a reaction of:

a) a solid catalyst component made from or containing a Ti compound and optionally an electron donor compound ED supported on MgCl$_2$;

b) an organo-Al compound; and optionally c) an external electron donor compound ED$_{ext}$.

In some embodiments, the titanium compounds are the tetrahalides or the compounds of formula TiX$_n$(OR$^1$)$_{4-n}$, where 0≤n≤3, X is halogen, and R$^1$ is C$_1$-C$_{10}$ hydrocarbon group. In some embodiments, the halogen is chlorine. In some embodiments, the titanium compound is titanium tetrachloride.

In some embodiments, the ED compound is selected from the group consisting of alcohols, ketones, amines, amides, nitriles, alkoxysilanes, aliphatic ethers, and esters of aliphatic carboxylic acids.

In some embodiments, the ED compound is selected the group consisting of amides, esters and alkoxysilanes.

In some embodiments, the ED compound is an ester. In some embodiments, the esters are selected from the group consisting of alkyl esters of C1-C20 aliphatic carboxylic acids, alternatively C1-C8 alkyl esters of aliphatic mono carboxylic acids. . In some embodiments, the ester is a C1-C8 alkyl ester of aliphatic mono carboxylic acids selected from the group consisting of ethylacetate, methyl formiate, ethylformiate, methylacetate, propylacetate, i-propylacetate, n-butylacetate, and i-butylacetate. In some embodiments, the ED compounds are aliphatic ethers, alternatively C2-C20 aliphatic ethers. In some embodiments, the C2-C20 aliphatic ether is tetrahydrofuran (THF) or dioxane.

In the solid catalyst component, the MgCl$_2$ is the basic support, even if minor amounts of additional carriers are used. In some embodiments, MgCl$_2$ is used or obtained from Mg compounds used as precursors that are transformed into MgCl$_2$ by reaction with halogenating compounds. In some embodiments, the MgCl$_2$ is used in active form.

In some embodiments, the catalysts are prepared by first contacting the titanium compound with the MgCl$_2$, or a precursor Mg compound, optionally in the presence of an inert medium, thereby preparing the solid component a) containing a titanium compound supported on MgCl$_2$, which component a) is optionally contacted with the ED compound which is added to the reaction mixture alone or in a mixture with other compounds wherein the ED compound represents the main component, optionally in the presence of an inert medium.

As used herein, the term "main component" indicates that ED compound is the main component in terms of molar amount, with respect to the other possible compounds excluding inert solvents or diluents used to handle the contact mixture. In some embodiments, the ED treated product is subjected to washings with the solvents to recover the final product. In some embodiments, the treatment with the ED compound is repeated one or more times.

In some embodiments, a precursor of MgCl$_2$ is used as starting Mg compound. In some embodiments, the precursor has the formula MgR'$_2$ wherein the R' groups is independently C1-C20 hydrocarbon groups optionally substituted, OR groups, OCOR groups, chlorine, wherein R is a C1-C20 hydrocarbon groups optionally substituted, with the proviso that the R' groups are not simultaneously chlorine. In some embodiments, the precursors are Lewis adducts between MgCl$_2$ and Lewis bases. In some embodiments, the precursors are MgCl$_2$ (R"OH)$_m$ adducts wherein R" groups are C1-C20 hydrocarbon groups, alternatively C1-C10 alkyl groups, and m is from 0.1 to 6, alternatively from 0.5 to 3, alternatively from 0.5 to 2. In some embodiments, the adducts are obtained by mixing alcohol and MgCl$_2$ in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, methods for the preparation of these spherical adducts are as described in U.S. Pat. Nos. 4,469,648 and 4,399,054, or Patent Cooperation Treaty Publication No. WO98/44009. In some embodiments, the method for spherulization is spray cooling as described in U.S. Pat. Nos. 5,100,849 and 4,829,034.

In some embodiments, the adducts are MgCl$_2$·(EtOH)$_m$ adducts wherein m is from 0.15 to 1.7, obtained by subjecting the adducts with a higher alcohol content to a thermal dealcoholation process carried out in nitrogen flow at temperatures between 50 and 150° C. until the alcohol content is reduced to the above value. In some embodiments, the process for preparing the adduct is as described in European Patent No. EP 395083.

In some embodiments, the dealcoholation is carried out chemically by contacting the adduct with compounds reacting with the alcohol groups.

In some embodiments, these dealcoholated adducts are characterized by a porosity (measured by mercury method) due to pores with radius up to 0.1 μm ranging from 0.15 to 2.5 cm$^3$/g, alternatively from 0.25 to 1.5 cm$^3$/g.

These adducts are reacted with the TiX$_n$(OR$^1$)$_{4-n}$ compound (or possibly mixtures thereof). In some embodiments, the TiX$_n$(OR$^1$)$_{4-n}$ compound is titanium tetrachloride. In some embodiments, the reaction with the Ti compound is carried out by suspending the adduct in TiCl$_4$. In some embodiments, the TiCl$_4$ is cold. The mixture is heated up to temperatures ranging from 80-150° C. and kept at this temperature for 0.5-2 hours. In some embodiments, the treatment with the titanium compound is carried out one or more times. In some embodiments, the treatment is carried out in the presence of an electron donor compound. In some embodiments and at the end of the process, the solid is recovered by separation of the suspension. In some embodiments, the separation occurs by settling and removing of the liquid, filtration, or centrifugation. In some embodiments, the solid is subjected to washings with solvents. In some embodiments, the washings are carried out with inert hydrocarbon liquids. In some embodiments, the washings are carried out with more polar solvents such as halogenated hydrocarbons. In some embodiments, the more polar solvents have a higher dielectric constant.

In some embodiments, the solid component a) is brought into contact with the ED compound under conditions able to fix an amount of donor on the solid. In some embodiments, the amount of donor used varies widely. In some embodiments, the amount of donor is in molar ratio with respect to the Ti content in the intermediate product ranging from 0.5 to 20, alternatively from 1 to 10. In some embodiments, the contact is carried out in a liquid medium such as a liquid hydrocarbon. In some embodiments, the temperature at which the contact takes place varies depending on the nature of the reagents. In some embodiments, the temperature is in the range from −10° to 150° C., alternatively from 0° to 120° C. In some embodiments, temperatures causing the decomposition or degradation of reagents are avoided even if the temperatures fall within the range. In some embodiments, the duration of the treatment depends on other conditions such as nature of the reagents, temperature, and concentration. In some embodiments, this contact step lasts from 10 minutes to 10 hours, alternatively from 0.5 to 5 hours. In some embodiments and to further increase the final donor content, this step is repeated one or more times. In some embodiments and at the end of this step, the solid is recovered by separation of the suspension. In some embodiments, the separation occurs by settling and removing of the liquid, filtration, or centrifugation. In some embodiments, the solid is subject to washings with solvents. In some embodiments, the washings are carried out with inert hydrocarbon liquids. In some embodiments, the washings are carried out with more polar solvents such as halogenated or oxygenated hydrocarbons. In some embodiments, the more polar solvents have a higher dielectric constant.

In some embodiments, the solid catalyst component is converted into catalysts for the polymerization of olefins by reacting the solid catalyst component with an organometallic compound of group 1, 2 or 13 of the Periodic Table of elements. In some embodiments, the organometallic compound is an Al-alkyl compound.

In some embodiments, the alkyl-Al compound is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound is selected from the group consisting of alkylaluminum halides, alkylaluminum hydrides and alkylaluminum sesquichlorides such as AlEt$_2$Cl and Al$_2$Et$_3$Cl$_3$ optionally in mixture with trialkyl aluminum compounds.

In some embodiments, the external electron donor compound ED$_{ext}$ optionally used to prepare the Ziegler-Natta catalysts are the same as or different from the ED used in the solid catalyst component a). In some embodiments, the external electron donor compound is selected from the group consisting of ethers, esters, amines, ketones, nitriles, silanes and their mixtures. In some embodiments, the external electron donor compound is selected from C2-C20 aliphatic ethers, alternatively cyclic ethers, alternatively cyclic ethers having 3-5 carbon atoms such as tetrahydrofuran and dioxane.

In some embodiments, the catalyst component a) is prepolymerized by producing reduced amounts of polyolefin, alternatively polypropylene or polyethylene.

In some embodiments, the solid component a) is treated with the ED compound and the prepolymerization is carried out before or after such treatment.

In some embodiments, the amount of prepolymer produced is up to 500 g per of component a). In some embodiments, the amount of prepolymer produced is from 0.5 to 20 g per g of solid component a).

In some embodiments, the prepolymerization is carried out with the use of a cocatalyst such as organoaluminum compounds. In some embodiments, the cocatalyst is used in combination with an external electron donor compound.

In some embodiments, the prepolymerization is carried out at temperatures from 0 to 80° C., alternatively from 5 to 70° C., in the liquid or gas phase.

In some embodiments, the polyethylene composition is prepared in a process including the following steps, in any mutual order:
  a) polymerizing ethylene, optionally together with one or more comonomers, in a first gas-phase reactor in the presence of a first amount of hydrogen;

b) copolymerizing ethylene with one or more comonomers in a second gas-phase reactor in the presence of a second amount of hydrogen less than the first amount of hydrogen in step a);

wherein, in at least one of the gas-phase reactors, the growing polymer particles flow upward through a first polymerization zone (riser) under fast fluidization or transport conditions, leave the riser and enter a second polymerization zone (downcomer) through which the growing polymer particles flow downward under the action of gravity, leave the downcomer and are reintroduced into the riser, thereby establishing a circulation of polymer between the two polymerization zones.

In some embodiments and in the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In some embodiments and in the second polymerization zone (downcomer), the polymer particles flow under the action of gravity in a densified form, thereby achieving high values of density of the solid (mass of polymer per volume of reactor) and approaching the bulk density of the polymer.

The polymer flows vertically down through the downcomer in a plug flow (packed flow mode), thereby limiting the quantities of gas entrained between the polymer particles.

From step a), component A) is an ethylene polymer having a molecular weight lower than the ethylene copolymer component B) obtained from step b).

In some embodiments, a polymerization of ethylene to produce a relatively low molecular weight ethylene polymer (step a) is performed upstream the copolymerization of ethylene to produce a relatively high molecular weight ethylene copolymer (step b). In some embodiments and in step a), a gaseous mixture made from or containing ethylene, hydrogen, optionally comonomer and an inert gas is fed to a first gas-phase reactor, alternatively a gas-phase fluidized bed reactor. The polymerization is carried out in the presence of the Ziegler-Natta catalyst.

Hydrogen is fed in an amount depending on the specific catalyst used to obtain in step a), an ethylene polymer with a melt flow index MIE of 130 g/10 min. g/10 min. or lower. To obtain the above MIE range, in step a), the hydrogen/ethylene molar ratio is from 1 to 4, the amount of ethylene monomer is from 2 to 20% by volume, alternatively from 4 to 15% by volume, based on the total volume of gas present in the polymerization reactor. The remaining portion of the feeding mixture is represented by inert gases and one or more comonomers, if any. Inert gases to dissipate the heat generated by the polymerization reaction are selected from nitrogen or saturated hydrocarbons. In some embodiments, the inert gas is propane.

In some embodiments, the operating temperature in the reactor of step a) is between 50 and 120° C., alternatively between 65 and 100° C., while the operating pressure is between 0.5 and 10 MPa, alternatively between 2.0 and 5 MPa.

In some embodiments, the ethylene polymer obtained in step a) represents from 30 to 70% by weight of the total ethylene polymer produced in the overall process, that is, in the first and second serially connected reactors.

The ethylene polymer coming from step a) and the entrained gas are then passed through a solid/gas separation step, thereby preventing the gaseous mixture coming from the first polymerization reactor from entering the reactor of step b) (second gas-phase polymerization reactor). In some embodiments, the gaseous mixture is recycled to the first polymerization reactor while the separated ethylene polymer is fed to the reactor of step b). In some embodiments, the polymer is fed into the second reactor on the connecting part between the downcomer and the riser.

In some embodiments, the operating temperature in step b) is in the range of 65 to 95° C., and the pressure is in the range of 1.5 to 4.0 MPa. In some embodiments, the second gas-phase reactor produces a relatively high molecular weight ethylene copolymer by copolymerizing ethylene with one or more comonomers. In some embodiments and to broaden the molecular weight distribution of the final ethylene polymer, the reactor of step b) is operated by establishing different conditions of monomers and hydrogen concentration within the riser and the downcomer.

In some embodiments and in step b), the gas mixture entraining the polymer particles and coming from the riser is partially or totally prevented from entering the downcomer, thereby obtaining two different gas composition zones. In some embodiments, the different gas composition zones are achieved by feeding a gas or a liquid mixture into the downcomer through a line placed at a point of the downcomer. In some embodiments, the point is in the upper part of the downcomer. In some embodiments, the gas or liquid mixture has a composition that is different from that of the gas mixture present in the riser. In some embodiments, the flow of the gas or liquid mixture is regulated so that an upward flow of gas counter-current to the flow of the polymer particles is generated and acts as a barrier to the gas mixture entrained among the polymer particles coming from the riser. In some embodiments, the regulation occurs at the top. In some embodiments, the feed has a mixture with low content of hydrogen, thereby producing the higher molecular weight polymer fraction in the downcomer. In some embodiments, one or more comonomers are fed to the downcomer of step b), optionally together with ethylene, propane or other inert gases.

In some embodiments, the hydrogen/ethylene molar ratio in the downcomer of step b) is between 0.01 and 0.5 and the ethylene concentration is from 5 to 20% by volume, based on the total volume of gas present in the downcomer. The rest is propane or similar inert gases. In some embodiments, a very low molar concentration of hydrogen is present in the downcomer, thereby permitting a comonomer to bond to the high molecular weight polyethylene fraction.

The polymer particles coming from the downcomer are reintroduced in the riser of step b).

In some embodiments and in the riser of step b), the hydrogen/ethylene molar ratio is in the range of 0.01 to 0.5 and the ethylene concentration is between 5 and 20% by volume based on the total volume of gas present in the riser.

In some embodiments, the comonomer content is controlled, thereby obtaining the desired density of the final polyethylene. In some embodiments, the concentration of the comonomer in the riser and in the downcomer is from 0.05 to 1% by volume, based on the total volume of gas present in said riser.

The rest is propane or other inert gases.

In some embodiments, the polymerization process is as described in Patent Cooperation Treaty Publication No. WO2005019280.

EXAMPLES

These Examples are illustrative and not intended to limit the scope of this disclosure.

The following analytical methods are used to characterize the polymer compositions.

Density

Determined according to ISO 1183-1:2012 at 23° C.

Complex shear viscosity $\eta_{0.02}$ (eta (0.02)) ER and ET

Measured at angular frequency of 0.02 rad/s and 190° C. as follows.

Samples were melt-pressed for 4 min under 200° C. and 200 bar into plates of 1 mm thickness. Disc specimens of a diameter of 25 mm were stamped and inserted in the rheometer, which was pre-heated at 190° C. The measurement was performed using an Anton Paar MCR 300 rotational rheometer, with a plate-plate geometry. A frequency-sweep was performed (after 4 min of annealing the sample at the measurement temperature) at T=190° C., under constant strain-amplitude of 5%, measuring and analyzing the stress response of the material in the range of excitation frequencies ω from 628 to 0.02 rad/s. The standardized basic software was utilized to calculate the rheological properties, that is, the storage-modulus, G', the loss-modulus, G", the phase lag δ (=arctan(G"/G')) and the complex viscosity, η*, as a function of the applied frequency, namely $\eta^*(\omega)=[G'(\omega)^2+G''(\omega)^2]^{1/2}/\omega$. The value of the latter at an applied frequency ω of 0.02 rad/s was the $\eta_{0.02}$.

ER was determined by the method described in R. Shroff and H. Mavridis, "New Measures of Polydispersity from Rheological Data on Polymer Melts," J. Applied Polymer Science 57 (1995) 1605 (see also U.S. Pat. No. 5,534,472 at Column 10, lines 20-30). ER was calculated from:

$$ER=(1.781*10^{-3})*G'$$

at a value of G"=5,000 dyn/cm².

When the lowest G" value was greater than 5,000 dyn/cm², the determination of ER involved extrapolation. The ER values calculated then depend on the degree on nonlinearity in the log G' versus log G" plot. The temperature, plate diameter and frequency range were selected such that, within the resolution of the rheometer, the lowest G" value was close to or less than 5,000 dyne/cm².

ET was determined by the method described in R. Shroff and H. Mavridis, "New Measures of Polydispersity from Rheological Data on Polymer Melts," J. Applied Polymer Science 57 (1995) 1605-1626 as well.

ET was calculated from:

$$ET=C2/G^* \text{at tan } \delta=C3$$

wherein:

$G^*=[(G')_2+(G'')_2]^{1/2}$;

tan δ=G"/G';

$C_2=10^6$ dyn/cm² and $C_3=1.5$.

HMWcopo Index

HMWcopo (High Molecular Weight Copolymer) Index is defined by the following formula:

$$\text{HMWcopo}=(\eta_{0.02} \times t_{maxDSC})/(10^5)$$

The $t_{maxDSC}$ was determined using a Differential Scanning calorimetry apparatus, TA Instruments Q2000, under isothermal conditions at a constant temperature of 124° C. 5-6 mg of sample were weighed and brought into aluminum DSC pans. The sample was heated at a rate of 20K/min up to 200° C. and cooled down at a rate of 20K/min to the test temperature, thereby erasing the thermal history. The isothermal test began immediately after. The time was recorded until crystallization occurs. The time interval until the crystallization heat flow maximum (peak), $t_{maxDSC}$, was determined using the vendor software (TA Instruments). The measurement was repeated 3× times. An average value was then calculated (in min). If no crystallization was observed under these conditions for more than 120 minutes, the value of $t_{maxDSC}$=120 minutes was used for further calculations of the HMWcopo index.

The melt viscosity $\eta_{0.02}$ value was multiplied by the $t_{maxDSC}$ value. The product was normalized by a factor of 100000 (10^5).

Molecular Weight Distribution Determination

The determination of the molar mass distributions and the means $M_n$, $M_w$ and $M_w/M_n$ derived therefrom was carried out by high-temperature gel permeation chromatography using a method described in ISO 16014-1, -2, -4, issues of 2003. The solvent was 1,2,4-trichlorobenzene (TCB). The temperature of apparatus and solutions was 135° C. A PolymerChar (Valencia, Paterna 46980, Spain) IR-4 infrared detector was the concentration detector. A WATERS Alliance 2000 equipped with pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used.

The solvent was vacuum distilled under nitrogen and stabilized with 0.025% by weight of 2,6-di-tert-butyl-4-methylphenol. The flowrate used was 1 ml/min. The injection was 500 μl. The polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany)) in the range from 580 g/mol up to 11600000 g/mol and additionally with hexadecane.

The calibration curve was then adapted to polyethylene (PE) by the Universal Calibration method (Benoit H., Rempp P. and Grubisic Z., & in J. Polymer Sci., Phys. Ed., 5, 753(1967)). The Mark-Houwing parameters used were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraße 36, D-55437 Ober-Hilbersheim, Germany) respectively.

Melt Flow Index

Determined according to ISO 1133-2:2011 at 190° C. with the specified load.

Long Chain Branching Index (LCBI)

The LCB index corresponded to the branching factor g', measured for a molecular weight of $10^6$ g/mol. The branching factor g', which allows determining long-chain branches at high Mw, was measured by Gel Permeation Chromatography (GPC) coupled with Multi-Angle Laser-Light Scattering (MALLS). The radius of gyration for each fraction eluted from the GPC (with a flow-rate of 0.6 ml/min and a column packed with 30 μm particles) was measured by analyzing the light scattering at the different angles with the MALLS (detector Wyatt Dawn EOS, Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software.

The parameter g' was the ratio of the measured mean square radius of gyration to that of a linear polymer having the same molecular weight. Linear molecules showed g' of 1 while values less than 1 indicated the presence of LCB. Values of g' as a function of mol. weight, M, were calculated from the equation:

$$g'(M) = <R_g^2>_{sample,M} / <R_g^2>_{linear\ ref.,M}$$

where $<R_g^2>$, M was the root-mean-square radius of gyration for the fraction of mol. weight M.

The radius of gyration for each fraction eluted from the GPC (with a flow-rate of 0.6 ml/min and a column packed with 30 μm particles) was measured by analyzing the light scattering at the different angles. The mol. weight M and $<R_g^2>_{sample,M}$ were determined, and the g' was defined at a measured M=$10^6$ g/mol. The $<R_g^2>_{linear\ ref.,M}$ was calculated by the relation between radius-of-gyration and molecular weight for a linear polymer in solution (Zimm B H, Stockmayer W H, "The Dimensions of Chain Molecules Containing Branches and Rings" The Journal of Chemical Physics 17, 1301 (1949)) and confirmed by measuring a linear PE stamdard.

The two linear PE standards IUPAC 5A and IUPAC 5B were used for experimental validation.

Comonomer Content

The comonomer content was determined by IR in accordance with ASTM D 6248 98, using an FT-IR spectrometer Tensor 27 from Bruker, calibrated with a chemometric model for determining ethyl- or butyl-side-chains in PE for butene or hexene as comonomer, respectively. The result was compared to the estimated comonomer content derived from the mass-balance of the polymerization process and found to be in agreement.

Dart Drop Index (DDI)

Determined according to ASTM D1709, method A, on a film having thickness of 12.5 μm. The film was produced as described in the bubble stability test, with the following base settings:
throughput: 72 Kg/h;
blow-up ratio BUR: 4;
neck length NL: 960 mm (8DD);
haul-off speed: 67 m/min.

Bubble Stability Test and Extrusion Pressure

The bubble stability test BST was performed on a commercial monolayer blown-film line from Hosokawa-Alpine, with the following characteristics:
single screw extruder with grooved and cooled feeding section, gravimetric dosing;
screw with diameter D=50 mm, length 30D, with shear and mixing elements;
temperature profile (11 zones) rising from 180° C. to 220° C. to obtain melt temperatures in the range of 205° C.+/−5° C. (Extruder: 180/185/190/195/200/205/205, head:210/210/220/220);
melt temperature measured after screens;
screen changer: screen area 120 cm², no screen pack used, just die-plate with 50 to 60 holes of approximately 2 mm in diameter;
melt pressure (extrusion pressure): measured before screen changer;
film die with diameter 120 mm, die gap 1.0 mm, with spiral mandrel (4 ports);
double lip cooling ring (Hosokawa-Alpine CR32), chilled cooling air (18° C.+/−2° C.), no internal bubble cooling IBC;
calibration basket; basket height adequate to neck length (970 mm from upper edge cooling ring to lower end basket was used);
wooden flattening device, take-off unit and film winder;

The bubble stability test started with the following base settings:
throughput: 72 Kg/h;
blow-up ratio BUR: 4;
neck length NL: 960 mm (8DD);
film thickness: 12.5 μm;
haul-off speed: 67 m/min.

The horizontal (HM) and vertical movement (VM) of the bubble was observed for 3 minutes at stable conditions.

If this movement of the bubble was below +/−3 cm in both directions, the sample received a score of 25 points.

To measure the horizontal and vertical movement of the bubble, cross line lasers were used (see FIGURE below).

The haul-off speed was increased in steps of 5 m/min (throughput, BUR and NL being maintained constant) which resulted in a reduced film thickness as indicated in the table below.

At a given haul-off speed, the bubble was again observed for 3 minutes after stable conditions were reached.

If HM and VM were:
≤+/−3 cm, 3 points were added;
≤+/−5 cm, 2 points were added;
≤+/−10 cm, 1 point was added;
≥+/−10 cm, 0 points were added.

If the movement was ≤5 cm (2 or 3 points), the test continued and the haul-off speed was increased further. Once the movement was ≥+/−5 cm (1 or 0 points), the test ended.

When the test started with the base setting (72 Kg/h, BUR: 4, NL 960 mm, 12.5 μm, 67 m/min) and HM or VM were >3 cm, the score of 25 points was reduced by 3 points ((HM or VM>+/−10 cm), 2 points (HM or VM+/−5 to 10 cm), or 1 point (HM or VM+/−3 to 5 cm), which resulted in a minimum score of 22 points.

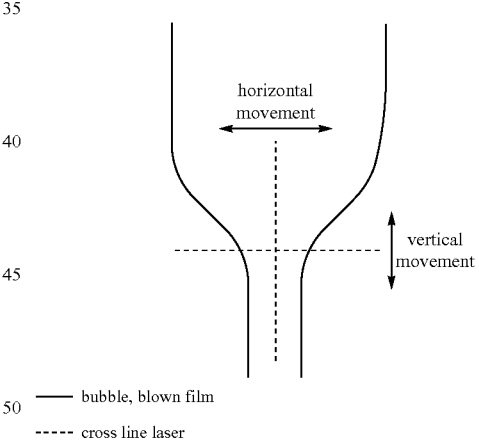

— bubble, blown film
----- cross line laser

The below example shows results for a sample where the test ended at an haul-off speed of 97 m/min and a horizontal or vertical movement of the bubble of >5 cm and <10 cm (1 point, end of test).

The total score was 39 points.

| Throughput [kg/h] | BUR | NL [mm] | film thickness [μm] | haul-off speed [m/min] | Example Score |
|---|---|---|---|---|---|
| 72 | 4 | 960 | 12.5 | 67 | 25 |
| 72 | 4 | 960 | 11.6 | 72 | 3 |
| 72 | 4 | 960 | 10.9 | 77 | 3 |
| 72 | 4 | 960 | 10.2 | 82 | 3 |

-continued

| Throughput [kg/h] | BUR | NL [mm] | film thickness [μm] | haul-off speed [m/min] | Example Score |
|---|---|---|---|---|---|
| 72 | 4 | 960 | 9.6 | 87 | 2 |
| 72 | 4 | 960 | 9.1 | 92 | 2 |
| 72 | 4 | 960 | 8.6 | 97 | 1 |
| 72 | 4 | 960 | ... | ... | ... |

Process Setup

The polymerization process was carried out under continuous conditions in a plant including two serially connected gas-phase reactors, as shown in the FIGURE.

The polymerization catalyst was prepared as follows.

A magnesium chloride and alcohol adduct containing about 3 mols of alcohol was prepared following the method described in example 2 of U.S. Pat. No. 4,399,054, but working at 2000 RPM instead of 10000 RPM. The adduct was subjected to a thermal treatment, under nitrogen stream, over a temperature range of 50-150° C. until a weight content of 25% of alcohol was reached. Into a 2 L four-necked round flask, purged with nitrogen, 1 L of $TiCl_4$ was introduced at about 0° C. Then, at about the same temperature, 70 g of a spherical $MgCl_2$/EtOH adduct containing 25% wt of ethanol and were added under stirring. The temperature was raised to about 140° C. in about 2 h and maintained for about 60 min. Then, the stirring was discontinued. The solid product was allowed to settle. The supernatant liquid was siphoned off The solid residue was then washed once with heptane at 80° C. and five times with hexane at 25° C. and dried under vacuum at 30° C.

An amount of solid catalyst component was prepolymerized with propylene in amount of 1 g polypropylene/g of catalyst component, as described in Example 7 of Patent Cooperation Treaty Publication No. WO01/85803.

Polymerization

Example 1

A polyethylene was prepared in a cascade of a fluidized-bed reactor and a multizone circulating reactor having two interconnected reaction zones as shown in the FIGURE.

For carrying out the polymerization, 9.5 g/h of the solid catalyst were fed using 1.5 kg/h of liquid propane to a first stirred precontacting vessel, into which also triisobutylaluminum (TIBA) were dosed. The weight ratio between aluminum alkyl to the Ziegler catalyst was 2:1. The first precontacting vessel was kept at 40° C. with an average residence time of 25 minutes. The catalyst suspension of the first precontacting vessel was continuously transferred to a second stirred precontacting vessel, which was operated with an average residence time of 25 minutes and kept also at 40° C. The catalyst suspension was then transferred continuously to fluidized-bed reactor (FBR) (1) via line (2).

In fluidized-bed reactor (1), ethylene was polymerized in the presence of propane as an inert diluent using hydrogen as molecular weight regulator. 47 kg/h of ethylene, 165 g/h of hydrogen and 11 kg/h of propane were fed to fluidized-bed reactor (1) via line 3. No comonomer was added. The polymerization was carried out at a temperature of 80° C. and a pressure of 3.0 MPa. The feed rates resulted in an ethylene concentration in the reactor of 7.4 vol.-% and a molar ratio of hydrogen/ethylene in the reactor of 2.7.

The polyethylene produced in fluidized-bed reactor (1) had a MIE of 102 g/10 min and a density of 0.968 g/cm³.

The polyethylene produced in fluidized-bed reactor (1) was continuously transferred to multizone circulating reactor (MZCR), which was operated at a pressure of 2.6 MPa and a temperature of 83° C., measured at the gas exit from reactor, and run in a monomodal set-up with flushing the barrier.

The riser (5) had an internal diameter of 200 mm and a length of 19 m. The downcomer (6) had a total length of 18 m, an upper part of 5 m with an internal diameter of 300 mm and a lower part of 13 m with an internal diameter of 150 mm. The monomers to the downcomer were fed in 3 positions. In dosing point 1 (8), located just below the barrier, 25 kg/h of liquid condensate (10), 10 kg/h of ethylene (9) and 900 g/h of 1-hexene (9) were introduced. In dosing point 2 (11), located 2.3 meters below dosing point 1, 15 kg/h of liquid condensate (13) and 5 kg/h of ethylene (12) were introduced. In dosing point 3 (14), located 4.0 meters below dosing point 2, 15 kg/h of liquid condensate (16) and 5 kg/h of ethylene (15) were dosed. 5 kg/h of propane, 33.4 kg/h of ethylene and 8 g/h of hydrogen were fed through line 19 into the recycling system.

The liquid condensate, for flushing, was obtained from the stream coming from condensation of the recycle stream (line 19).

The final polymer was discontinuously discharged via line 18.

The first reactor produced around 46% by weight (split wt %) of the total amount of the final polyethylene resin produced by both first and second reactors.

The resulting polyethylene polymer had a final MIF of 10.7 g/10 min. The density was 0.951 g/cm³.

The comonomer (hexene-1) amount was of about 0.90% by weight.

Example 2

The conditions were kept the same as in example 1, except that 47 kg/h of ethylene, 150 g/h of hydrogen and 11 kg/h of propane were fed to fluidized-bed reactor (1) via line 3. The feed rates resulted in an ethylene concentration in the reactor of 6.6 vol.-% and a molar ratio of hydrogen/ethylene in the reactor of 2.7.

The polyethylene produced in fluidized-bed reactor (1) had a MIE of 99 g/10 min and a density of 0.968 g/cm³.

The monomers to the downcomer were fed in 3 positions. In dosing point 1 (8), 25 kg/h of liquid condensate (10), 10 kg/h of ethylene (9) and 450 g/h of 1-hexene (9) were introduced. In dosing point 2 (11), 15 kg/h of liquid condensate (13) and 5 kg/h of ethylene (12) were introduced. In dosing point 3 (14), 15 kg/h of liquid condensate (16) and 5 kg/h of ethylene (15) were dosed. 5 kg/h of propane, 34.8 kg/h of ethylene and 6.5 g/h of hydrogen were fed through line 19 into the recycling system.

The liquid condensate, for flushing, was obtained from the stream coming from condensation of the recycle stream (line 19).

The first reactor produced around 45% by weight (split wt %) of the total amount of the final polyethylene resin produced by both first and second reactors.

The resulting polyethylene polymer had a final MIF of 11.5 g/10 min. The density was 0.954 g/cm³.

The comonomer (hexene-1) amount was of about 0.45% by weight.

Example 3

The conditions were kept the same as in example 1, except that for carrying out the polymerization, 10.5 g/h of the solid catalyst and 0.21 g/h of tetrahydrofuran (THF) were fed using 1.5 kg/h of liquid propane to a first stirred precontacting vessel, into which also triisobutylaluminum (TIBA) were dosed. The weight ratio between aluminum alkyl to the Ziegler catalyst was 2:1.

46 kg/h of ethylene, 185 g/h of hydrogen and 11 kg/h of propane were fed to fluidized-bed reactor (1) via line 3. The feed rates resulted in an ethylene concentration in the reactor of 7.3 vol.-% and a molar ratio of hydrogen/ethylene in the reactor of 3.4.

The polyethylene produced in fluidized-bed reactor (1) had a MIE of 101 g/10 min and a density of 0.968 g/cm$^3$.

The multizone circulating reactor (MZCR) was operated at a pressure of 2.6 MPa and a temperature of 85° C., measured at the gas exit from reactor, and run in a monomodal set-up with flushing the barrier.

The monomers to the downcomer were fed in 3 positions. In dosing point 1 (8), 25 kg/h of liquid condensate (10), 9.5 kg/h of ethylene (9) and 500 g/h of 1-hexene (9) were introduced. In dosing point 2 (11), 15 kg/h of liquid condensate (13) and 4.5 kg/h of ethylene (12) were introduced. In dosing point 3 (14), 15 kg/h of liquid condensate (16) and 4.5 kg/h of ethylene (15) were dosed. 5 kg/h of propane, 31.8 kg/h of ethylene and 10 g/h of hydrogen were fed through line 19 into the recycling system.

The liquid condensate, for flushing, was obtained from the stream coming from condensation of the recycle stream (line 19).

The first reactor produced around 47% by weight (split wt %) of the total amount of the final polyethylene resin produced by both first and second reactors.

The resulting polyethylene polymer had a final MIF of 7.1 g/10 min. The density was 0.953 g/cm$^3$.

The comonomer (hexene-1) amount was of about 0.52% by weight.

Example 4

The conditions were kept the same as in example 1, except that for carrying out the polymerization, 12.5 g/h of the solid catalyst and 0.25 g/h of THF were fed using 1.5 kg/h of liquid propane to a first stirred precontacting vessel, into which also triisobutylaluminum (TIBA) were dosed. The weight ratio between aluminum alkyl to the Ziegler catalyst was 2:1.

49.5 kg/h of ethylene, 185 g/h of hydrogen and 11 kg/h of propane were fed to fluidized-bed reactor (1) via line 3. The feed rates resulted in an ethylene concentration in the reactor of 7.5 vol.-% and a molar ratio of hydrogen/ethylene in the reactor of 3.2.

The polyethylene produced in fluidized-bed reactor (1) had a MIE of 95 g/10 min and a density of 0.967 g/cm$^3$.

The multizone circulating reactor (MZCR) was operated at a pressure of 2.6 MPa and a temperature of 85° C. measured at the gas exit from reactor and run in a monomodal set-up with flushing the barrier.

The monomers to the downcomer were fed in 3 positions. In dosing point 1 (8), 25 kg/h of liquid condensate (10), 9.5 kg/h of ethylene (9) and 1000 g/h of 1-hexene (9) were introduced. In dosing point 2 (11), 15 kg/h of liquid condensate (13) and 4.5 kg/h of ethylene (12) were introduced. In dosing point 3 (14), 15 kg/h of liquid condensate (16) and 4.5 kg/h of ethylene (15) were dosed. 5 kg/h of propane, 31.5 kg/h of ethylene and 8 g/h of hydrogen were fed through line 19 into the recycling system.

The liquid condensate, for flushing, was obtained from the stream coming from condensation of the recycle stream (line 19).

The first reactor produced around 49% by weight (split wt %) of the total amount of the final polyethylene resin produced by both first and second reactors.

The resulting polyethylene polymer had a final MIF of 10.0 g/10 min. The density was 0.951 g/cm$^3$.

The comonomer (hexene-1) amount was of about 1.0% by weight.

Comparative Example 1

A polyethylene was prepared in a cascade of a fluidized-bed reactor and a multizone circulating reactor having two interconnected reaction zones as shown in the FIGURE.

For carrying out the polymerization, 10.8 g/h of the solid catalyst prepared as described in Example 1 of Patent Cooperation Treaty Publication No. WO2016206958 were fed using 1.1 kg/h of liquid propane to a first stirred precontacting vessel, into which also triisobutylaluminum (TIBA) and diethylaluminumchloride (DEAC) were dosed. The weight ratio between triisobutylaluminum and diethylaluminum chloride was 7:1. The weight ratio between aluminum alkyl to the Ziegler catalyst was 5:1. The first precontacting vessel was kept at 50° C. with an average residence time of 30 minutes. The catalyst suspension of the first precontacting vessel was continuously transferred to a second stirred precontacting vessel, which was operated with an average residence time of 30 minutes and kept also at 50° C. The catalyst suspension was then transferred continuously to fluidized-bed reactor (FBR) (1) via line (2).

In fluidized-bed reactor (1), ethylene was polymerized in the presence of propane as an inert diluent using hydrogen as a molecular weight regulator. 50 kg/h of ethylene, 235 g/h of hydrogen and 11 kg/h of propane were fed to fluidized-bed reactor (1) via line 3. No comonomer was added. The polymerization was carried out at a temperature of 80° C. and a pressure of 3.0 MPa. The feed rates resulted in an ethylene concentration in the reactor of 9.9 vol.-% and a molar ratio of hydrogen/ethylene in the reactor of 2.6.

The polyethylene produced in fluidized-bed reactor (1) had a MIE of 91 g/10 min and a density of 0.967 g/cm$^3$.

The polyethylene produced in fluidized-bed reactor (1) was continuously transferred to multizone circulating reactor (MZCR), which was operated at a pressure of 2.6 MPa and a temperature of 80° C., measured at the gas exit from reactor, and run in a monomodal set-up with flushing the barrier. The riser (5) had an internal diameter of 200 mm and a length of 19 m. The downcomer (6) had a total length of 18 m, an upper part of 5 m with an internal diameter of 300 mm and a lower part of 13 m with an internal diameter of 150 mm. The monomers to the downcomer were fed in 3 positions. In dosing point 1 (8), located just below the barrier, 25 kg/h of liquid condensate (10), 10 kg/h of ethylene (9) and 1000 g/h of 1-hexene (9) were introduced. In dosing point 2 (11), located 2.3 meters below dosing point 1, 15 kg/h of liquid condensate (13) and 5 kg/h of ethylene (12) were introduced. In dosing point 3 (14), located 4.0 meters below dosing point 2, 15 kg/h of liquid condensate (16) and 5 kg/h of ethylene (15) were dosed. 5 kg/h of propane, 30.0 kg/h of ethylene and 5 g/h of hydrogen were fed through line 19 into the recycling system.

The liquid condensate, for flushing, was obtained from the stream coming from condensation of the recycle stream (line 19).

The final polymer was discontinuously discharged via line 18.

The first reactor produced around 49% by weight (split wt %) of the total amount of the final polyethylene resin produced by both first and second reactors.

The resulting polyethylene polymer had a final MIF of 8.7 g/10 min. The density was 0.951 g/cm³.

The comonomer (hexene-1) amount was of about 1.0% by weight.

TABLE 1

|  | Ex. 1 | Ex. 2 | Ex. 3 | Ex. 4 | Comp. 1 |
|---|---|---|---|---|---|
| Operative conditions first reactor | | | | | |
| $H_2/C_2H_4$ Molar ratio | 2.7 | 2.7 | 3.4 | 3.2 | 2.6 |
| $C_2H_4$% | 7.4 | 6.6 | 7.3 | 7.5 | 9.9 |
| Density of A) (g/cm³) | 0.968 | 0.968 | 0.968 | 0.967 | 0.967 |
| MIE [2.16 kg] of A) (g/10 min.) | 102 | 99 | 101 | 95 | 91 |
| Split (wt. %) | 46 | 45 | 47 | 49 | 49 |
| Operative conditions second reactor | | | | | |
| $H_2/C_2H_4$ Molar ratio riser | 0.047 | 0.060 | 0.066 | 0.072 | 0.042 |
| $C_2H_4$% riser | 12.3 | 12.5 | 11.0 | 10.5 | 7.0 |
| $C_6H_{12}$% riser | 0.21 | 0.13 | 0.19 | 0.32 | 0.34 |
| Final Polymer properties | | | | | |
| MIF [21.6 kg] (g/10 min.) | 10.7 | 11.5 | 7.1 | 10.0 | 8.7 |
| MIP [5 kg] (g/10 min.) | 0.34 | 0.37 | 0.26 | 0.36 | 0.28 |
| MIF/MIP | 31.5 | 31.1 | 27.3 | 28.0 | 31.0 |
| Density (g/cm³) | 0.951 | 0.954 | 0.953 | 0.951 | 0.951 |
| Mn (g/mol)-conventional | 7993 | 6200 | 7975 | 8944 | 10140 |
| Mw (g/mol)-conventional | 352753 | 363578 | 359831 | 339202 | 354911 |
| Mw/Mn | 44.1 | 58.7 | 45.1 | 37.9 | 35.0 |
| LCBI | 0.50 | 0.49 | 0.63 | 0.59 | 0.74 |
| $\eta_{0.02}$ | 85102 | 77493 | 109280 | 88211 | 135096 |
| $(\eta_{0.02}/1000)$/LCBI | 170 | 158 | 173 | 150 | 183 |
| Isothermic DSC at 124° C. [min] | 2.3 | 1.5 | 1.9 | 3.1 | 3.4 |
| HMW COPO Index | 2.0 | 1.2 | 2.1 | 2.7 | 4.6 |
| ER | 4.0 | 4.1 | 2.9 | 3.2 | 3.0 |
| ET | 14.5 | 15.3 | 7.2 | 9.3 | 9.9 |
| Film processing | | | | | |
| Film extruder p [bar] | 366 | 372 | 428 | 381 | 390 |
| Bubble stability test [score] | 56 | 71 | 49 | 50 | 32 |
| DDI [g]* | 275 | 231 | 495 | 384 | 431 |

Notes
$C_2H_4$ = ethylene;
$C_6H_{12}$ = hexene; ethylene and hexene amounts are in percent by volume;
Split = weight amount of polymer produced in the concerned reactor;
*neck height: 8DD, BUR: 4:1, rate = 72 kg/h, film thickness = 12.5 μm.

What is claimed is:

1. A polyethylene composition comprising:
A) 30-70% by weight of an ethylene homopolymer or copolymer with density equal to or greater than 0.960 g/cm³, determined according to ISO 1183-1:2012 at 23° C., and melt flow index MIE at 190° C. with a load of 2.16 kg, according to ISO 1133-2:2011, of 130 g/10 min or lower; and B) 30-70% by weight of an ethylene copolymer having a MIE value lower than the MIE value of A);
amounts of A) and B) being referred to a total weight of A)+B);
the polyethylene composition having the following features:
1) density from 0.948 to 0.960 g/cm³, determined according to ISO 1183-1:2012 at 23° C.;
2) ratio MIF/MIP from 20 to 40, where MIF is measured at 190° C. with a load of 21.60 kg, and MIP is measured at 190° C. with a load of 5 kg, both determined according to ISO 1133-2:2011;
3) MIF from 6 to 15 g/10 min;
4) High Molecular Weight copolymer, HMWcopo, index from 0.5 to 3.5;
5) long-chain branching index, LCBI, equal to or lower than 0.82;
wherein the HMWcopo index is determined according to the following formula:

HMWcopo=$(\eta_{0.02} \times t_{maxDSC})/(10^5)$ wherein $\eta_{0.02}$, complex viscosity of a melt in Pa·s, is measured at a temperature of 190° C., in a parallel-plate rheometer under dynamic oscillatory shear mode with an applied angular frequency of 0.02 rad/s; $t_{maxDSC}$ is time, measured in minutes, to reach the maximum value of heat flow of crystallization at a temperature of 124° C. under quiescent conditions, measured in isothermal mode in a differential scanning calorimetry apparatus; and LCBI is a ratio of a measured mean-square radius of gyration $R_g$, measured by GPC-MALLS, to a mean-square radius of gyration for a linear PE having the same molecular weight at a molecular weight of 1,000,000 g/mol; and
6) $\eta_{0.02}$ of equal to or less than 150000.

2. The polyethylene composition of claim 1, comprising one or more ethylene copolymers.

3. The polyethylene composition of claim 1 obtained using a Ziegler-Natta polymerization catalyst.

4. The polyethylene composition of claim 3, wherein the Ziegler-Natta polymerization catalyst comprises the product of a reaction of:
a) a solid catalyst component comprising a Ti compound supported on $MgCl_2$;
b) an organo-Al compound; and optionally
c) an external electron donor compound.

5. The polyethylene composition of claim 1, having at least one of the following additional features:
density of ethylene homopolymer or copolymer A) from 0.960 to 0.971 g/cm³;
ratio $(\eta_{0.02}/1000)$/LCBI, which is between $\eta_{0.02}$ divided by 1000 and LCBI, of from 120 to 180;
$M_w$ values from 200000 to 400000 g/mol;
$M_w/M_n$ values from 25 to 65;
Comonomer content equal to or less than 2% by weight with respect to a total weight of the composition (as determined by IR);
rheological polydispersity, ER, values from 2 to 5;
ET values equal to or lower than 25;
wherein ER is calculated from:

ER=$(1.781 \times 10^{-3}) \times G'$ at a value of G''=5,000 dyn/cm²;
wherein ET is calculated from:

ET=$C_2/G^* $ at tan δ=$C_3$ wherein:
$G^*=[(G')^2 (G'')^2]^{1/2}$;
tan δ=$G''/G'$;
$C_2=10^6$ dyn/cm²
$C_3=1.5$ G'=storage-modulus; and
G"=loss-modulus;
   both G' and G" being measured with dynamic oscillatory shear in a plate-plate rotational rheometer at a temperature of 190° C.;
long-chain branching index, LCBI, equal to or lower than 0.70.

6. The polyethylene composition of claim 1, having a blown film bubble stability score (BSS) of 52 or higher for values of dart drop impact strength (DDI) from 200 to 350 g and a BSS of 40 or higher for values of (DDI) of higher than 350 g.

7. A manufactured article comprising the polyethylene composition of claim 1.

8. The manufactured article according to claim 7, wherein the manufactured article is a monolayer blown film or a multilayer blown film, wherein at least one layer comprises the polyethylene composition.

9. The manufactured article according to claim 8, wherein the monolayer blown film or the multilayer blown film has a bubble stability score (BSS) of 52 or higher for values of dart drop impact strength (DDI) from 200 to 350 g and a BSS of 40 or higher for values of DDI higher than 350 g.

10. A process for preparing the polyethylene composition of claim 1 comprising the step of polymerizing ethylene, optionally together with one or more comonomers, in the presence of a Ziegler-Natta polymerization catalyst supported on $MgCl_2$.

11. The process of claim 10, comprising the following steps, in any mutual order:
   a) polymerizing ethylene, optionally together with one or more comonomers, in a first gas-phase reactor in the presence of a first amount of hydrogen;
   b) copolymerizing ethylene with one or more comonomers in a second gas-phase reactor in the presence of a second amount of hydrogen less than the first amount of hydrogen in step a);
wherein, in at least one of the gas-phase reactors, growing polymer particles flow upward through a first polymerization zone under fast fluidization or transport conditions, leave a riser and enter a second polymerization zone through which the growing polymer particles flow downward under the action of gravity, leave the second polymerization zone and are reintroduced into the first polymerization zone, thereby establishing a circulation of polymer between the first and second polymerization zones.

* * * * *

UNITED STATES PATENT AND TRADEMARK OFFICE
CERTIFICATE OF CORRECTION

PATENT NO. : 11,845,854 B2  
APPLICATION NO. : 17/275874  
DATED : December 19, 2023  
INVENTOR(S) : Meier et al.

Page 1 of 1

It is certified that error appears in the above-identified patent and that said Letters Patent is hereby corrected as shown below:

In the Specification

In Column 4, Line 55, delete "0.02/1000V LCBI" and insert -- $(\eta_{0.02}/1000)/$ LCBI --, therefor In Column 6, Line 4, delete "Ziegler-Nana" and insert -- Ziegler-Natta --, therefor In Column 11, Line 25, delete "phase lag 6" and insert -- phase lag $\delta$ --, therefor In Column 11, Line 50, delete "ET = C2/G*at tan $\delta$ = C3" and insert -- ET = $C_2$/G*at tan $\delta$ = $C_3$ --, therefor In Column 11, Line 52, delete "G* = [(G')$_2$ + (G")$_2$]$^{1/2}$;" and insert -- G* = [(G')$^2$ + (G")$^2$]$^{1/2}$; --, therefor In the Claims In Column 20, Claim 5, Line 63, delete "G* = [(G)$^2$ (G")$^2$]$^{1/2}$;" and insert -- G*=[(G')$^2$+(G")$^2$]$^{1/2}$;--, therefor Signed and Sealed this  
Twenty-first Day of January, 2025

Coke Morgan Stewart  
*Acting Director of the United States Patent and Trademark Office*